United States Patent [19]

Ehrhardt

[11] Patent Number: 5,769,124

[45] Date of Patent: Jun. 23, 1998

[54] FRESH WATER SUPPLY SYSTEM FOR AN AIRCRAFT

[75] Inventor: Joachim Ehrhardt, Beckdorf, Germany

[73] Assignee: Daimler-Benz Aerospace Airbus GmbH, Hamburg, Germany

[21] Appl. No.: 815,570

[22] Filed: Mar. 12, 1997

[30] Foreign Application Priority Data

Mar. 14, 1996 [DE] Germany ................. 196 09 939.0

[51] Int. Cl.$^6$ ..................................... E03B 7/07
[52] U.S. Cl. .................. 137/625.47; 137/899.2
[58] Field of Search ............ 137/625.46, 625.47, 137/899.2

[56] References Cited

U.S. PATENT DOCUMENTS

| | | | |
|---|---|---|---|
| 4,593,717 | 6/1986 | Levasseur | 137/625.47 X |
| 5,261,440 | 11/1993 | Frank . | |
| 5,303,739 | 4/1994 | Ellgoth et al. . | |
| 5,309,938 | 5/1994 | Ellgoth et al. . | |
| 5,529,758 | 6/1996 | Houston | 137/625.47 X |

Primary Examiner—John Fox
Attorney, Agent, or Firm—W. G. Fasse; W. F. Fasse

[57] ABSTRACT

A water supply system for an aircraft includes a ventilatable water tank, a water supply line to supply water to water-using devices such as galleys and handwash basins, fill and drain lines, and a multi-function valve for carrying out filling and draining, and other system functions. The multi-function valve is interposed between the water tank, the water supply line, the fill line, and the drain line. The valve includes a filling port connected to the filling line, a tank port connected to the water tank, a supply port connected to the supply line, a drain port connected to the drain line, and preferably also a tank overflow port and an outside overflow port. The valve includes a shut-off element arranged within a housing, wherein the shut-off element has therein a water passage which includes first, second, and third branches, and preferably also an air passage. The valve can be operated to switch the valve selectively into a normal operating position, a closed or shut-off position, a fill and drain position, or a total drain position. The multi-function valve replaces a plurality of individual valves, thereby reducing the number of components and the total weight of the system, and the time and costs for installation.

20 Claims, 3 Drawing Sheets

FRESH WATER SUPPLY SYSTEM FOR AN AIRCRAFT

FIELD OF THE INVENTION

The invention relates to a fresh water supply system in an aircraft including at least one ventable or ventilatable water tank, at least one water supply line for water-using devices such as galley sinks and wash basins and the like, filling and draining lines, and valves having shut-off elements and water line connector ports.

BACKGROUND INFORMATION

In conventional fresh water systems in aircraft, shut-off valves are typically used for filling and draining the system. Such shut-off valves are normally motor driven. A typical presently known water system is shown in FIG. 1. Such a known water system includes a first shut-off valve arranged in a drain line for switching between a filling operation and a draining operation. A second valve is necessary to allow a ventilating of the tank during the filling or draining of the water system. A further shut-off valve is arranged between the water tanks and the supply line system, in order to isolate or separate from the rest of the system a water tank that has been emptied, in order to prevent air from the empty tank from being pushed into the water system, which is being supplied with water from other water tanks.

The known arrangement of three valves for the water supplying functions and the filling and draining operations of the system necessarily involves a relatively high effort and expense for assembly and installation thereof. This is especially true since many auxiliary components are necessary for the installation of such valve, as, for example, heating elements, insulating mats, heating bridges, and the like for reducing the danger of freezing of each valve, as well as mounting components and switching arrangements, as well as other elements. It is thus a desired goal to simplify the presently known water supply system in order to reduce the installation effort and expense, and also to meet the ever-present requirement of achieving a lightweight structure in the field of aircraft construction.

Various arrangements of water supply systems for aircraft are set forth in U.S. Pat. No. 5,261,440 (Frank), U.S. Pat. No. 5,303,739 (Ellgoth et al.), and U.S. Pat. No. 5,309,938 (Ellgoth et al.), the disclosures of which are incorporated herein by reference.

SUMMARY OF THE INVENTION

In view of the above it is an object of the invention to provide a fresh water supply system for an aircraft of the above described general type, which is substantially simplified in comparison to the prior art, whereby especially the necessary installation effort and expense is considerably reduced and a weight reduction is achieved as an essential result. Further objects of the invention are to overcome or avoid the other problems of the prior art systems that are evident from the above discussion.

In order to achieve these objects, the invention provides a water system for an aircraft having the same general tank and water line components as discussed generally above, but also including a special multi-function valve for achieving filling and draining operations. It should be understood that the term "line" as used herein refers to any appropriate pipe, tube, conduit, hose, duct, or the like. The multi-function valve is generally arranged and interposed between the water tank, the water supply line system, the water filling line, and the drain line. The multi-function valve particularly comprises a fill water port connected to the water filling line, a tank port connected to the water tank or tanks, a supply port connected to the water supply line system for supplying water to water-using devices in the aircraft, and a drain port connected to the drain line. The valve includes a special shut-off element having a water channel or passage therein, which ends in first, second, and third branches.

By appropriately rotating the shut-off element of the valve, the valve provides the desired connection between any two or more of the lines connected to the valve, or completely shuts off all of the lines, as necessary. The unique multi-function valve according to the invention advantageously provides the following connections or interconnections among the various lines. In the normal valve position, i.e. valve position I, the tank port is connected to the supply port leading to the water-using devices. In the shut-off position, i.e. valve position II, none of the ports are interconnected, i.e. all of the ports are shut off. In a filling and draining position, i.e. valve position III, the fill-water port, the tank port, and the water supply port are interconnected. In a total or remainder draining position, i.e. valve position IV, the fill-water port, the tank port, the water supply port, and the drain port are interconnected. Since the single multi-function valve according to the invention can selectively provide each of the above described interconnections, the need to use three independent valves as in the prior art system is avoided. Thus, the invention especially reduces the total number of components of the system, and thereby reduces the installation time, cost, and weight.

The system according to the invention may further, preferably, include any one or more of particular detailed features, for example as follows. The multi-function valve may include a tank overflow port and an outside overflow port that leads to an outside overflow line. In this case, the shut-off element in the valve includes a separate air channel or passage which connects the tank overflow port with the outside overflow port during filling and draining operations. These measures especially provide the advantage that the tank is connected to the environment outside of the aircraft when the valve is set in the filling and draining position as well as in the total or rest draining position. Such a connection of the tank to the outside environment enables a venting and ventilating of the system.

The shut-off element of the multi-function valve is preferably embodied as a ball or as a cylinder. It is further desirable that the water channel is arranged in a first plane and the air channel is arranged in a second plane of the shut-off element in such a manner that all of the various selectable valve positions can be achieved within a 90° angular rotation of the shut-off element. Preferably, the air channel is a through-going bored hole in the second plane of the shut-off element, which interconnects the tank overflow port with the directly opposite outside overflow port. The three branches of the water channel are preferably arranged in the first plane of the shut-off element respectively extending generally along radii from the center axis of the shut-off element, with all three of the branches arranged within an angular range of 180°. Each branch of the water channel may respectively be formed with a tapered funnel shape.

A manual operating lever and a motor are preferably provided and connected to drive the multi-function valve, whereby end position switches may be provided for the motor to determine or set the respective valve switching positions. The motor may be a stepper motor. For convenience of manual operation, the manual operating lever is especially arranged on the outside of the aircraft fuselage near the fuselage drain outlets, with operating cables connecting the lever to the multi-function valve.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
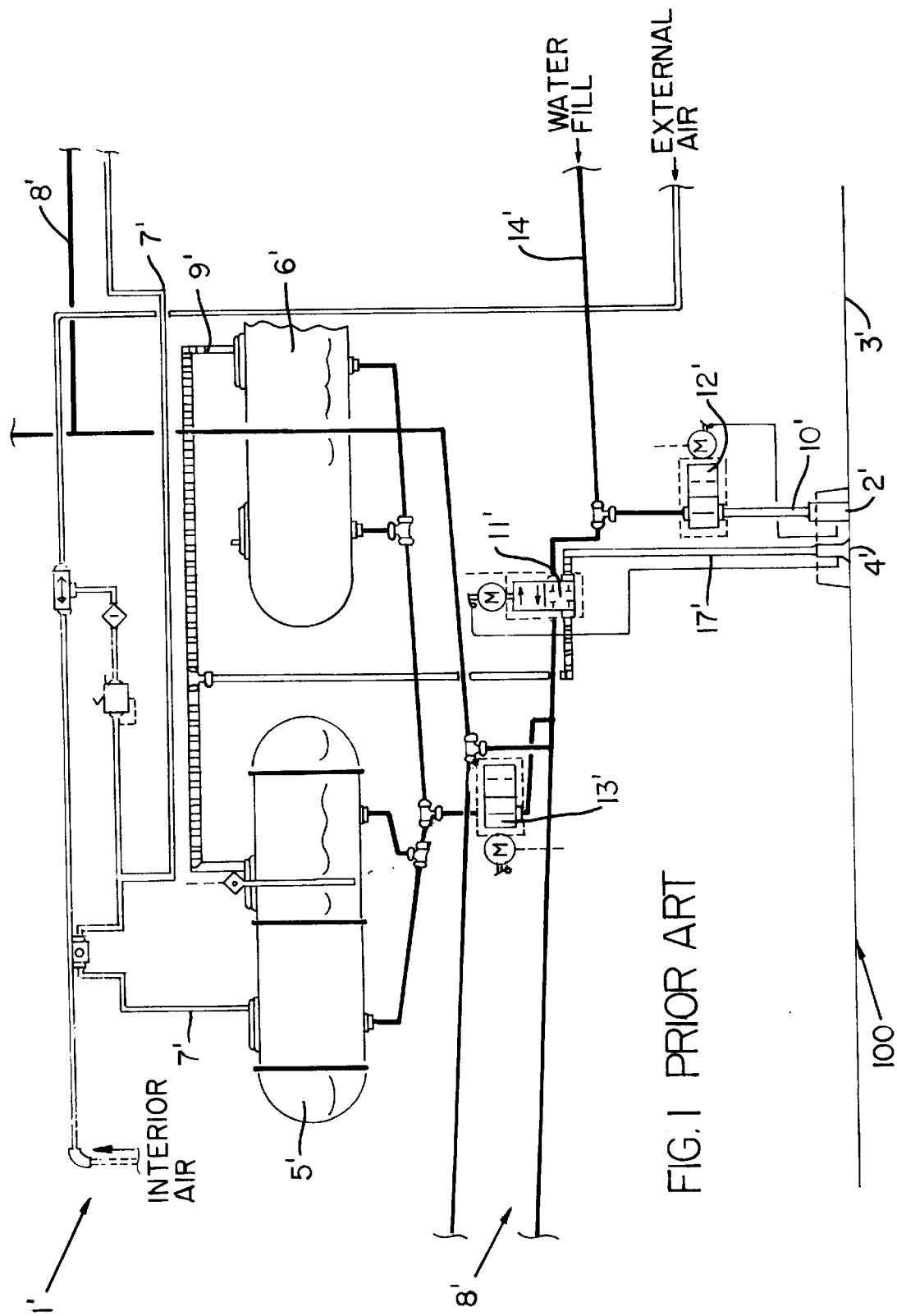
FIG. 1 is a schematic side view of a fresh water supply system installed within an aircraft, according to the prior art.

FIG. 1 schematically shows a portion of a fresh water supply systeym 1' for an aircraft 100, embodied according to the present state of the art. The water system 1' essentially includes a plurality of water tanks 5' and 6' as well as further tanks, which are not shown, connected to a water supply line system 8'. The water line system 8 has respective water outlets (e.g. schematically shown at 8A in FIG. 2) in order to supply fresh water to various water-using devices onboard the aircraft, for example onboard galleys, handwash basins, and in some cases toilets. A pressurized air line system 7' pressurizes the water system 1' when water is withdrawn from the water outlets, for example, of the galleys, toilets, or wash basins.

The pressurized air system 7' also pressurizes the water system 1' in order to improve the emptying or draining of the tanks. Draining of the water system 1' is carried out through a drain line 10', among others, which drains the water to the environment outside of the aircraft fuselage 3' through a fuselage drain outlet 2'. An overflow line 9' is arranged and connected to the upper area of the water tanks 5' and 6', and leads via an outside overflow line 17' to a fuselage overflow outlet 4' that is provided in the aircraft fuselage 3' near the fuselage drain outlet 2'. The overflow line 9' simultaneously serves for venting and ventilating the water tanks.

For filling and draining the water system in the middle or central area of the fuselage, a motor driven valve 11' having two shut-off balls and a further motor driven valve 12' having one shut-off ball is utilized. The second motorized valve 12' is embodied as a drain valve and is arranged in the drain line 10' to be switchable between the conditions of filling the system from the fill line 14' or draining the system through the drain line 10' and the fuselage drain outlet 2'. The first mentioned motorized valve 11' is embodied as a fill and drain valve and is arranged in both the overflow line 9' and the fill line 14'. This valve 11' has two switching positions I' and II'. In the first position 1' the water system 1' may be filled or drained, with the overflow line 9' and the fill line 14' respectively opened for through-flow, i.e. the overflow line 9' is connected to the outside overflow line 17' and the water fill line 14' is connected to the lines leading to the tanks and water supply lines, while the valve 12' must also be open for carrying out a draining function. In the second valve position II', the overflow line 9' and the fill line 14' are respectively shut-off, i.e. the connections to the outside are closed, so that the water system 1' is set in a closed or sealed operating condition and can thus be pressurized.

A third shut-off valve 13' is arranged between the water tanks 5' and 6' on the one hand and the water supply line system 8' on the other hand. This third shut-off valve 13' is necessary to avoid the danger of pressurized air being pressed into the water system 1' from a specific water tank that has already been emptied of water. In other words, the shut-off valve 13' serves to isolate the emptied tanks from the rest of the water supply system, and then water is supplied to the water system from the other tanks, not shown, which are still full of water.

The arrangement of three separate shut-off valves 11', 12', and 13' in the fresh water system 1' according to the prior art involves a relatively high assembly and installation expense and effort, since a relatively great number of auxiliary components are also necessary for the installation of each valve. For example, each valve requires freeze-preventing heating elements, insulation mats, heating bridges, mounting brackets, operating levers or other operating linkages, and switching arrangements. In order to reduce the assembly and installation effort and expense, and to accomplish the ever-present goal in aircraft construction of achieving a lighter construction, it is desired to simplify the conventional water system especially for carrying out the filling and draining functions.

Figure 2:
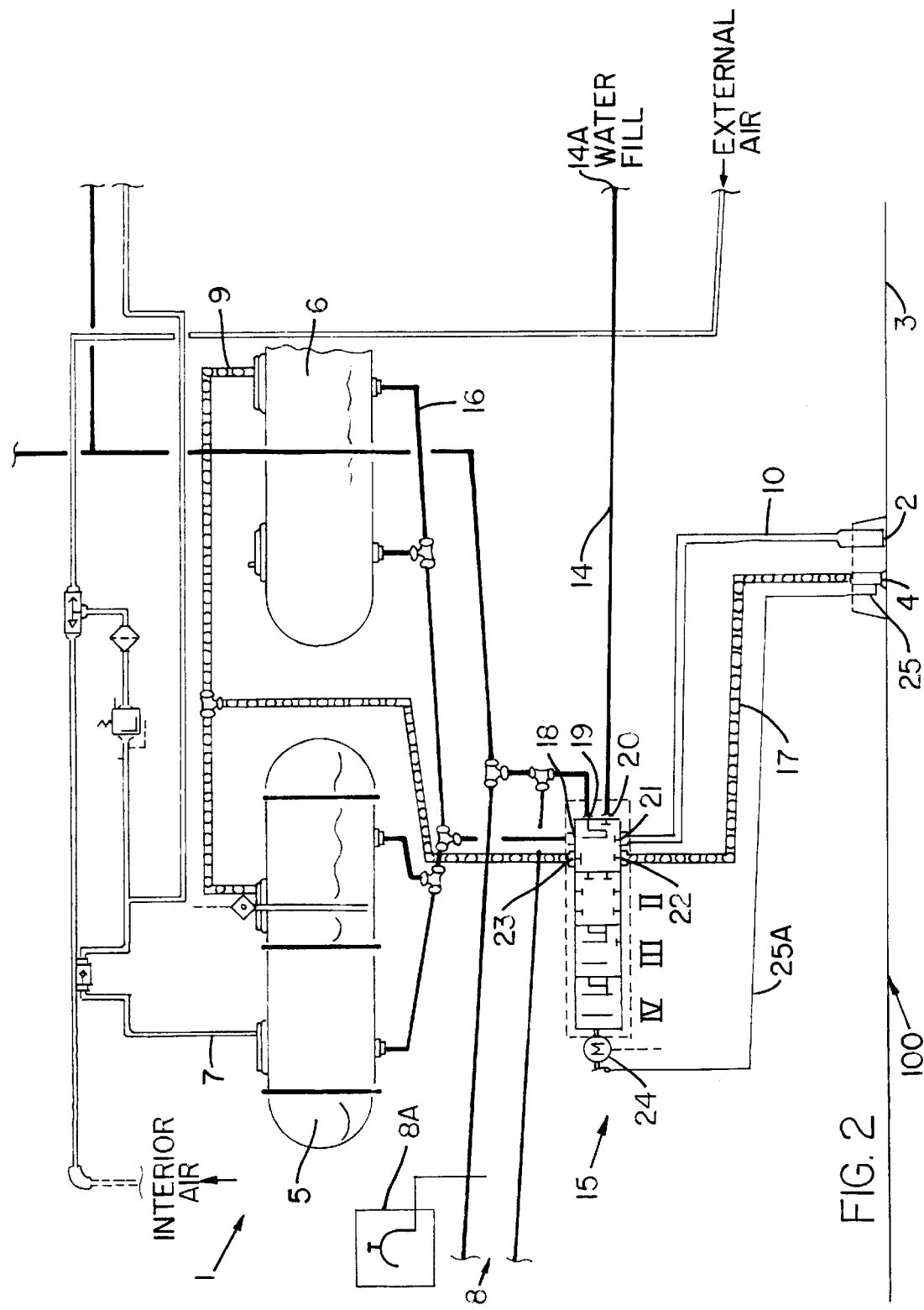
FIG. 2 is a schematic side view of a fresh water supply system generally similar to that shown in FIG. 1, but having a special arrangement and interconnection of a multi-function valve for filling and draining the system, according to the invention.

FIG. 2 shows a fresh water supply system 1 for an aircraft 100, using a multi-function valve 15 for the filling and draining of the water system according to a particular embodiment of the invention. The components of the inventive water supply system 1 that are the same or comparable to the above described components of the prior art supply system 1' respectively bear the same reference numbers, except without a prime mark ('). To avoid redundancy, the complete description of these components will not be repeated here. Generally, in the present inventive water supply system 1, the multi-function valve 15 has replaced the three separate valves 11', 12', and 13' provided in the conventional system 1'. Moreover, the multi-function valve 15 provides additional and simplified functions as well. The assembly and installation effort and expense is thereby considerably reduced, and the necessary heating of the valve 15 is significantly less difficult and costly as compared to the heating of three separate valves arranged at three different locations. A weight reduction of the overall system is also achieved by the inventive reduction of the number of valves and auxiliary components.

The arrangement and functioning of the multi-function valve 15 within the inventive supply system 1 will now be described. The multi-function valve 15 has six ports or connections to the conduits or lines of the conduit network of the water system 1, namely: a tank port 18 connected to a tank line 16 from the water tanks 5 and 6; a water-using device supply port 19 connected to a line or conduit of the water supply system 8 that provides water to various water-using devices onboard the aircraft; a fill water port 20 connected to a filling line 14; a drain port 21 connected to a drain line 10; an outside overflow port 22 connected to an outside overflow line 17; and a tank overflow port 23 connected to a tank overflow line 9.

The multi-function valve 15 is configured and arranged so that it can be operated to realize four different valve setting positions I, II, III, and IV, which will now be described. In valve setting position I, which is the valve position shown in FIG. 2, the tank port 18 and the supply port 19 to the water-using devices are connected together. In this normal or usual setting of the valve during flight of the aircraft 100, there is an open flow connection between the tanks 5 and 6 and the water supply line 8 leading to the water-using devices. In other words, the water system 1 is in a ready state for supplying water in its usual operation.

If the particular water tanks 5 and 6 are to be disconnected or isolated from the fresh water supply system in the aircraft, the valve 15 is switched to the valve position II. With this valve setting, all of the valve ports are closed. Such a valve setting is necessary when, for example, the water tanks 5 and 6 have been emptied during the flight, so that these tanks 5 and 6 are to be isolated from the rest of the system, which is then supplied from other water tanks which still contain water.

In a third valve position III of the valve 15, the supply port 19 for supplying water to the water-using devices is connected for open through-flow with the fill water port 20 and with the tank port 18, which is connected to the tank supply line 16 from the water tanks 5 and 6. In other words, in the valve position III, the ports 18, 19, and 20 are all connected together. Moreover, the port 21 is closed, while the tank overflow port 23 and the outside overflow port 22 are also connected to each other. Thus, in the valve switching position III, the water system 1 may be filled or drained from the outside through a water inlet 14A of the water filling line 14. This filling and draining valve position III is only used when the aircraft is on the ground.

The valve position IV is also provided for draining the water supply system 1. The valve position IV provides the same connections as described above for the valve position III, and additionally provides a connection through the drain port 21 to the drain line 10 and finally out through the fuselage drain outlet 2. In other words, in the switching position IV, the ports 18, 19, 20, and 21 are all connected together. In this manner, a direct draining of the system from beneath the valve 15 is made possible, and the entire water system 1 can be completely drained, which is especially necessary when the aircraft is to be parked for longer periods of time in cold environmental conditions, in order to prevent freezing of the fresh water supply system in the aircraft.

An electric motor 24 is provided for the usual actuation of the valve 15 during the operation of the aircraft, i.e. to switch the valve into the selected one of the four valve switching positions. However, a manual operating mechanism is provided, for example preferably a hand operated lever 25, by which each of the positions of the valve 15 may also be selected, so that the valve 15 remains fully operable even when electric power is not available to operate the motor 24. Preferably, the hand operated lever 25 is arranged outside of the aircraft fuselage 3 near the fuselage outlets 2 and 4, and is operatively connected to the valve 15 by a linkage or cable such as a Bowden control cable 25A. In this manner, an emergency operation or a manual operation of the valve 15 by maintenance personnel outside the parked aircraft are made possible.

Figure 3A:
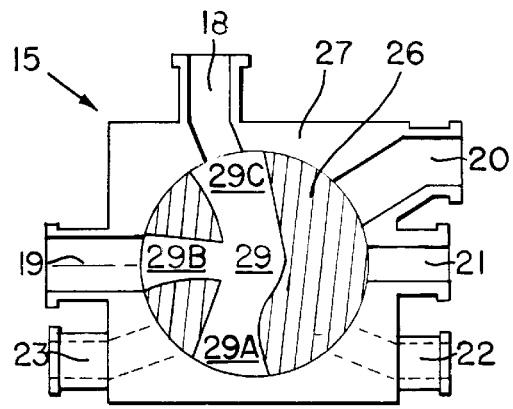
FIGS. 3A, 3B, 3C and 3D are sectional views through the multi-function valve of the water system according to FIG. 2, taken along a first plane to show the water flow channels in the valves, in respective different valve setting positions.
Figure 3B:
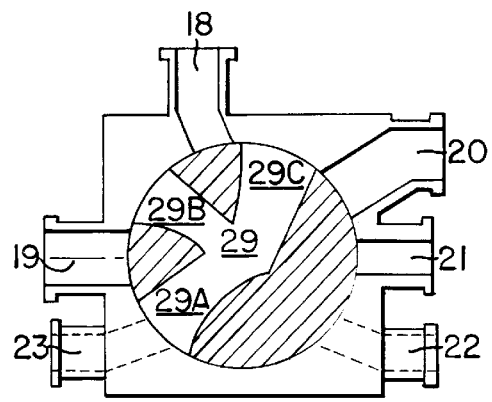
Figure 3C:
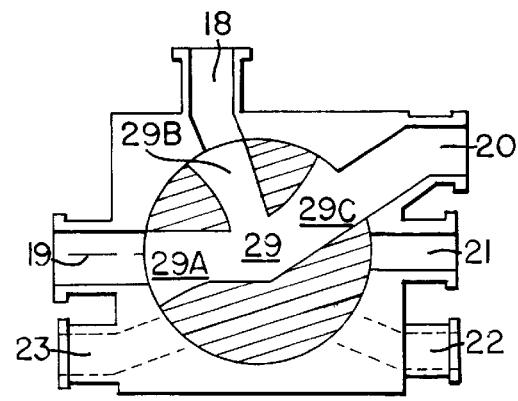
Figure 3D:
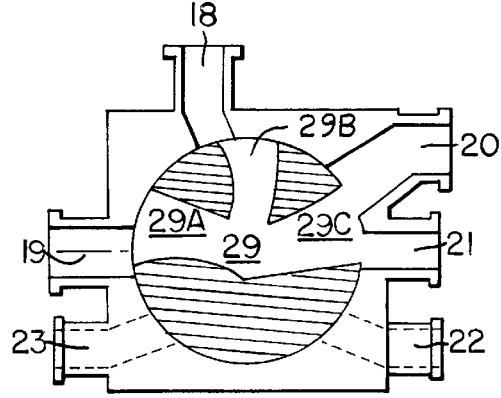
Figure 4A:
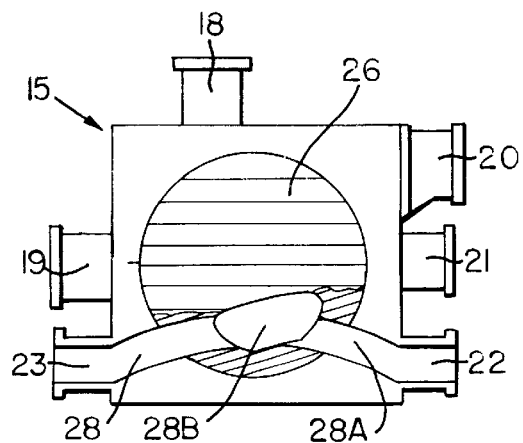
FIGS. 4A, 4B are sectional views taken on a second plane in the valve of FIGS. 3A, 3B, 3C, and 3D, to show the air flow channels in two different valve setting positions for ventilation.
Figure 4B:
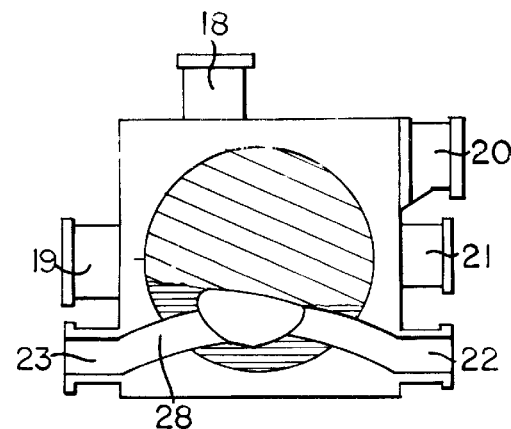

FIGS. 3A, 3B, 3C, 3D, 4A and 4B show one possible, preferred embodiment of the multi-function valve 15 for realizing the four above described valve setting positions. The valve 15 comprises a valve shut-off element 26 movably arranged within a valve housing 27. The shut-off element 26 may preferably be embodied as a shut-off ball or as a shut-off cylinder. The six above described ports 18 to 23 to be connected to lines of the water system are provided in the valve housing 27. The shut-off element 26 comprises an air channel or passage 28 and a water channel or passage 29, which are not connected to each other. For example, the passages are preferably arranged as bored holes in the shut-off element 26, and the air passage 28 and water passage 29 preferably lie in two separate planes. In other words, the sectional views of FIGS. 3A, 3B, 3C and 3D are taken along a first section plane through the valve 15 to show the water passages 29 in the four valve setting positions, while the views of FIGS. 4A and 4B are taken along a second section plane to show the air passage 28 in two of the valve positions.

The water passage 29 in the first plane is branched so as to include a first branch 29A, a second branch 29B and a third branch 29C, which selectively align with one or more of the ports 18, 19, 20, and 21 so as to interconnect selected ones of the ports. The branches preferably respectively radiate outwardly from a center or rotation axis of the shut-off element 26 within an angular sector of less than 180°. In other words, the three branches 29A, 29B and 29C join together near the center of the shut-off element 26, and radiate generally outwardly in the manner of spokes of a wheel over an angular span of less than 180°. Thereby, all of the valve switching positions can be achieved by rotating the shut-off element 26 within a rotational angle of 90°. Within this 90° angular rotational range, the necessary switching positions are determined or realized by end position switches on the motor 24. The air passage 28 provided in the second plane is for connecting the tank overflow port 23 with the outside overflow port 22. This air passage 28 is preferably embodied in the form of a through-going bored hole.

The arrangement or configuration of the water passage 29 in the shut-off element 26 is shown in FIGS. 3A, 3B, 3C, and 3D respectively corresponding to the valve switching positions I, II, III, and IV. Similarly, FIGS. 4A and 4B show the position and configuration of the air passage 28 in the valve switching positions III and IV. More specifically, FIGS. 3A to 3D show the position and orientation of the branches 29A, 29B and 29C of the water passage 29 relative to the ports 18 to 21. The fill water port 20 and the drain port 21 are provided on one side of the valve housing 27. In the actual installed condition or orientation of the valve 15, at least the drain port 21 will be arranged and oriented at the lowest lying point in the water supply system 1 in order to enable the complete draining and emptying of all lines of the water supply system 1. The water-using device supply port 19 is provided on the side of the valve housing 27 opposite the ports 20 and 21. A third side of the valve housing 27 includes the water tank port 18 therein.

In the valve position I, as shown in FIG. 3A, the water passage branches 29C and 29B of the water passage 29 provide a connection from the tank port 18 to the water-using device supply port 19. This is the normal or usual operating valve position in which the water stored in the tanks 5 and 6 can be supplied to the water-using devices, such as galleys, handwash basins, and toilets through the water supply line network.

FIG. 3B shows the position of the branches of the water passage 29 in the valve position II. In this position, none of the line ports are interconnected by the water passage 29. In other words, this position is a complete shut-off position, which is realized in that the branches 29A, 29B, and 29C have their radially outer openings or ends positioned against the inner wall of the valve housing 27 without providing a connection to any of the ports 18 to 23, and accordingly each of the ports is blocked or closed by the shut-off element 26.

FIG. 3C shows the valve position III. The water-using device supply port 19 is connected to the water tank port 18 through the branches 29A and 29B of the water passage 29. A further connection to the fill water port 20 is provided through the third branch 29C of the water passage 29. In other words, the ports 18, 19, and 20 are interconnected together, to provide a fill and drain position of the valve 15. Moreover, in this position, the tank overflow port 23 is connected to the oppositely located outside overflow port 22 through the air passage 28, as shown in FIG. 4A. In this manner, a venting and ventilation of the tanks 5 and 6 is assured, which is necessary for carrying out the filling and draining of the water supply system 1.

FIG. 3D and corresponding FIG. 4B respectively show the arrangement of the water passage 29 and the air passage 28 in the valve 15 for realizing the valve switching position IV for carrying out a draining operation of the entire water supply system 1. The same connections as discussed above for the valve position III are also achieved in the present valve position IV. Additionally, the drain port 21 is also connected to the water passage branch 29C. This is made possible by the funnel-shaped expanded radially outer ends of the branches 29A, 29B, and 29C, whereby a relatively small angular rotational adjustment of the shut-off element 26 within the valve housing 27 relative to the position shown in FIG. 3C, allows the ports 18, 19, and 20 to remain connected respectively to the branches 29A, 29B, and 29C, while the branch 29C also overlaps onto and connects with the port 21. In this manner, a direct drainage below the valve 15 is achieved. This total or remainder drainage position is for carrying out a complete emptying of the lines of the system. When the aircraft is to be parked for a relatively long period of time in a cold environment, either the water line system must be heated in a costly manner, or all of the water must be drained from the entire water system in the manner as described.

In a particular embodiment, the air passage 28 can include respective passage branches 28A provided from opposite sides in the valve housing 27, and a flow connecting pocket 28B provided in the shut-off element 26. When the shut-off element 26 is in the positions shown in FIGS. 3A and 3B (valve positions I and II), the channel pocket 28B is rotated away from, i.e. out of alignment with, the channel branches 28A, so that no flow-through path is provided. However, when the shut-off element 26 is in the positions shown in FIGS. 3C, 3D and 4A, 4B (valve positions III and IV), then the channel pocket 28B in the shut-off element 26 is in overlapping alignment with the channel branches 28A in the housing 27 to provide a through-flow channel.

As an alternative to the specific channel configurations shown in FIGS. 3A to 3D, 4A and 4B, the air passage 28 may also be configured as a simple bored passage in a manner similar to the water passage 29, rather than a configuration using a channel pocket 28B and channel branches 28A. The specific configuration and position of the branches of the water passage 29, and of the ports 18 to 23 illustrated in the figures and described above are also merely representative examples, while other functional configurations could be used to achieve the desired valve setting positions.

Although the invention has been described with reference to specific example embodiments, it will be appreciated that it is intended to cover all modifications and equivalents within the scope of the appended claims. It should be further understood that the present invention encompasses any combination of the features recited in any two or more of the appended claims.

What is claimed is:

1. A water supply system for an aircraft including at least one water-using device, said water supply system comprising a ventilatable water tank, a water supply line adapted to be connected to said water-using device for supplying water thereto, a fresh water filling line, a drain line, and a multi-function valve interposed between said water tank, said supply line, said filling line, and said drain line, wherein said valve comprises a valve housing and a shut-off element movably arranged in said housing, wherein said housing includes a filling port connected to said filling line, a tank port connected to said water tank, a supply port connected to said supply line, and a drain port connected to said drain line, and wherein said shut-off element has a water flow passage therein including and terminating in a first branch, a second branch, and a third branch.

2. The water supply system of claim 1, wherein said fresh water filling line includes and terminates in a water inlet adapted to have fresh water filled thereinto from an external water source, and said drain line includes and terminates in a water drain outlet adapted to drain water therefrom.

3. The water supply system of claim 1, further comprising a tank line, wherein said tank port of said valve is connected to said tank via said tank line.

4. The water supply system of claim 1, wherein said filling port, said tank port, said supply port, and said drain port are so configured and positioned on said housing, and said first, second and third branches are so configured and positioned in said shutoff element, such that respective ones of said branches can be brought into flow communication with selected ones of said ports by moving said shut-off element within said housing selectively into four valve setting positions including a first valve setting position in which said tank port is in flow communication with said supply port through said water flow passage and said filling port and said drain port are respectively closed by said shut-off element, a second valve setting position in which said tank port, said supply port, said filling port, and said drain port are respectively closed by said shut-off element, a third valve setting position in which said tank port, said supply port, and said filling port are all in flow communication with each other through said water flow passage and said drain port is closed by said shut-off element, and a fourth valve setting position in which said tank port, said supply port, said filling port, and said drain port are all in flow communication with each other through said water flow passage.

5. The water supply system of claim 4, further comprising an outside overflow outlet line, wherein said valve housing further includes a tank overflow port connected to said water tank and an overflow outlet port connected to said outside overflow outlet line, and wherein said shut-off element further has an air flow passage therein that is separate from said water flow passage and that is so configured and positioned in said shut-off element such that said tank overflow port is brought into flow communication with said overflow outlet port when said shut-off element is in said third valve setting position.

6. The water supply system of claim 5, wherein said air flow passage is further so configured and positioned in said shut-off element such that said tank overflow port is brought into flow communication with said overflow outlet port also when said shut-off element is in said fourth valve setting position, and such that said tank overflow port and said overflow outlet port are closed by said shut-off element when said shut-off element is in said first and second valve setting positions.

7. The water supply system of claim 1, further comprising an outside overflow outlet line, wherein said valve housing further includes a tank overflow port connected to said water tank and an overflow outlet port connected to said outside overflow outlet line, and wherein said shut-off element further has an air flow passage therein that is separate from said water flow passage and that is so configured and positioned to selectively bring said tank overflow port and said overflow outlet port into flow communication with each other when said shut-off element is in at least one filling and draining position.

8. The water supply system of claim 1, wherein said water flow passage has a total of three of said branches, which are so configured and positioned relative to said ports so as to interconnect said filling port, said tank port, said supply port and said drain port mutually together for flow communication through said water flow passage by bringing one of said branches into overlapping flow connection with two of said ports.

9. The water supply system of claim 1, wherein said shut-off element has a ball shape.

10. The water supply system of claim 1, wherein said shut-off element has a cylinder shape.

11. The water supply system of claim 1, wherein said water flow passage is arranged on a first plane in said shut-off element, said shut-off element further has an air flow passage therein arranged on a second plane therein to be separate from said water flow passage, said valve housing further includes a tank overflow port and an overflow outlet port, and said water flow passage is so configured and positioned in said first plane and said air flow passage is so configured and positioned in said second plane such that respective ones of said branches of said water flow passage can be selectively brought into flow connection with respective ones of said filling port, said tank port, said supply port, and said drain port in a plurality of valve setting positions, and such that said air flow passage can be selectively brought into flow connection with said tank overflow port and said overflow outlet port in at least one of said valve setting positions, and such that all of said plural valve setting positions can be established within a 90° angular rotation of said shut-off element relative to said valve housing.

12. The water supply system of claim 1, wherein said water flow passage is arranged in a first plane in said shut-off element, said shut-off element further has an air flow passage therein arranged on a second plane therein to be separate from said water flow passage, said valve housing further includes a tank overflow port and an overflow outlet port, wherein said air flow passage is a through-going bored hole arranged so as to connect said tank overflow port with said overflow outlet port for flow therebetween.

13. The water supply system of claim 1, wherein said first, second, and third branches of said water flow passage are joined together substantially at an axis center of said shut-off element and respectively extend substantially radially outwardly from said axis center within an angular sector spanning less than 180° on a first plane in said shut-off element.

14. The water supply system of claim 13, wherein each of said branches of said water flow passage has a respective funnel shape that widens radially outwardly.

15. The water supply system of claim 1, further comprising a drive motor arrangement connected to said valve.

16. The water supply system of claim 15, wherein said drive motor arrangement includes end position switches for determining respective valve setting positions.

17. The water supply system of claim 1, further comprising a manually operable lever connected to said valve for manually operating said valve.

18. The water supply system of claim 17, further comprising a mechanical control cable, wherein said manually operable lever is adapted to be arranged externally on a fuselage of said aircraft and is connected to said valve via said control cable.

19. The water supply system of claim 1, in combination with said aircraft.

20. A multi-function valve for an aircraft water supply system including a water-using device, a water tank, a water supply line connected to said water-using device, a fresh water filling line, and a drain line, said multi-function valve comprising a valve housing and a shut-off element movably arranged in said housing, wherein said housing includes a filling port adapted to be connected to said filling line, a tank port adapted to be connected to said water tank, a supply port adapted to be connected to said supply line, and a drain port adapted to be connected to said drain line, wherein said shut-off element has a water flow passage therein, and wherein said ports are so configured and positioned in said housing and said water flow passage is so configured and positioned in said shut-off element such that said passage can selectively be brought into flow communication with selected ones of said ports by moving said shut-off element within said housing selectively into four valve setting positions including a first valve setting position in which said tank port is in flow communication with said supply port through said water flow passage and said filling port and said drain port are respectively closed by said shut-off element, a second valve setting position in which said tank port, said supply port, said filling port, and said drain port are respectively closed by said shut-off element, a third valve setting position in which said tank port, said supply port, and said filling port are all in flow communication with each other through said water flow passage and said drain port is closed by said shut-off element, and a fourth valve setting position in which said tank port, said supply port, said filling port, and said drain port are all in flow communication with each other through said water flow passage.

* * * * *